United States Patent [19]
Iinuma et al.

[11] Patent Number: 6,056,407
[45] Date of Patent: May 2, 2000

[54] PROJECTION DISPLAY DEVICE

[75] Inventors: Kazuyuki Iinuma, Hotaka-machi; Motoyuki Fujimori; Kazuto Shinohara, both of Suwa; Masashi Kitabayashi, Horigane-mura, all of Japan

[73] Assignee: Seiko Epson Corporation, Tokyo, Japan

[21] Appl. No.: 09/117,857

[22] PCT Filed: Dec. 17, 1997

[86] PCT No.: PCT/JP97/04652

§ 371 Date: Aug. 12, 1998

§ 102(e) Date: Aug. 12, 1998

[87] PCT Pub. No.: WO98/27453

PCT Pub. Date: Jun. 25, 1998

[30] Foreign Application Priority Data

Dec. 18, 1996 [JP] Japan .................................. 8-354186

[51] Int. Cl.[7] .................................................. G03B 21/14
[52] U.S. Cl. ............................ 353/119; 353/122; 353/81
[58] Field of Search ................................. 353/31, 33, 34, 353/81, 119, 120, 122; 349/58, 60

[56] References Cited

U.S. PATENT DOCUMENTS

| | | |
|---|---|---|
| 4,850,685 | 7/1989 | Kamakura et al. . |
| 5,092,671 | 3/1992 | Van Os ..................................... 353/31 |
| 5,418,586 | 5/1995 | Fujimori et al. ......................... 353/122 |
| 5,455,678 | 10/1995 | Loucks ..................................... 356/400 |
| 5,605,390 | 2/1997 | Brice et al. .............................. 353/119 |
| 5,624,174 | 4/1997 | Loucks ..................................... 353/122 |
| 5,868,485 | 2/1999 | Fujimori et al. ......................... 353/119 |

FOREIGN PATENT DOCUMENTS

| | | |
|---|---|---|
| 0 409 246 A2 | 1/1991 | European Pat. Off. . |
| A-57-124982 | 8/1982 | Japan . |
| U-60-30424 | 3/1985 | Japan . |
| A-60-117215 | 6/1985 | Japan . |
| A-60-242424 | 12/1985 | Japan . |
| A-61-118707 | 6/1986 | Japan . |
| U-62-47288 | 3/1987 | Japan . |
| U-62-47289 | 3/1987 | Japan . |
| U-62-181909 | 11/1987 | Japan . |
| A-63-10128 | 1/1988 | Japan . |
| A-63-97080 | 4/1988 | Japan . |
| U-63-66816 | 5/1988 | Japan . |
| U-63-81481 | 5/1988 | Japan . |
| A-63-132590 | 6/1988 | Japan . |
| U-63-90383 | 6/1988 | Japan . |

(List continued on next page.)

OTHER PUBLICATIONS

Tokyo Astronomical Observatory "Science Year Book 1984" (Tokyo) Maruzen Inc., Nov. 25, 1988, pp. 465–466.

High Polymer Institute High Polymer Dictionary Editorial Committee "New High Polymer Dictionary" (Tokyo) Asakura Publishing Inc., Nov. 25, 1988, pp. 530–537.

*Primary Examiner*—William Dowling
*Attorney, Agent, or Firm*—Oliff & Berridge, PLC

[57] ABSTRACT

A liquid crystal panel unit is provided on the light incident face of a prism combining body. The unit has a light valve frame plate for holding a liquid crystal panel and a fixing frame plate fixed onto the light incident face with an adhesive layer. The light valve frame plate is screwed onto the fixing frame plate with a medial frame therebetween. By using wedge members, by adjusting the position of the light valve frame plate on the light incident face, it is possible to precisely position and fix the liquid crystal panel which is held there so that it is possible to control the shifted amount of the pixel alignment and precisely adjust the focus. Thus, it is possible to easily improve the accuracy. Furthermore, the fixing frame plate and the light valve frame plate are composed of materials having linear expansion coefficients ranging from ¼ to four times that of the prism combining body and from ⅕ to five times that of the fixing frame plate, respectively.

18 Claims, 7 Drawing Sheets

U.S. PATENT DOCUMENTS

| | | |
|---|---|---|
| U-63-101985 | 7/1988 | Japan . |
| U-63-131290 | 8/1988 | Japan . |
| A-61-44693 | 2/1989 | Japan . |
| U-64-23185 | 2/1989 | Japan . |
| U-64-23186 | 2/1989 | Japan . |
| A-1-126869 | 5/1989 | Japan . |
| U-1-74688 | 5/1989 | Japan . |
| U-1-105280 | 7/1989 | Japan . |
| U-1-105281 | 7/1989 | Japan . |
| U-1-139284 | 9/1989 | Japan . |
| U-2-10681 | 1/1990 | Japan . |
| A-2-140067 | 5/1990 | Japan . |
| A-2-162881 | 6/1990 | Japan . |
| U-2-85422 | 7/1990 | Japan . |
| U-3-14883 | 2/1991 | Japan . |
| A-3-51881 | 3/1991 | Japan . |
| A-3-202845 | 9/1991 | Japan . |
| A-3-259691 | 11/1991 | Japan . |
| A-4-86620 | 3/1992 | Japan . |
| A-4-194921 | 7/1992 | Japan . |
| U-4-101579 | 9/1992 | Japan . |
| U-4-45343 | 10/1992 | Japan . |
| A-4-340918 | 11/1992 | Japan . |
| A-5-53516 | 3/1993 | Japan . |
| A-5-80320 | 4/1993 | Japan . |
| U-5-33130 | 4/1993 | Japan . |
| A-5-323257 | 12/1993 | Japan . |
| A-5-341302 | 12/1993 | Japan . |
| A-6-14326 | 1/1994 | Japan . |
| A-6-118368 | 4/1994 | Japan . |
| A-6-202193 | 7/1994 | Japan . |
| A-6-34774 | 12/1994 | Japan . |
| A-7-63965 | 3/1995 | Japan . |
| A-8-184797 | 7/1996 | Japan . |
| WO 95/12142 | 5/1995 | WIPO . |

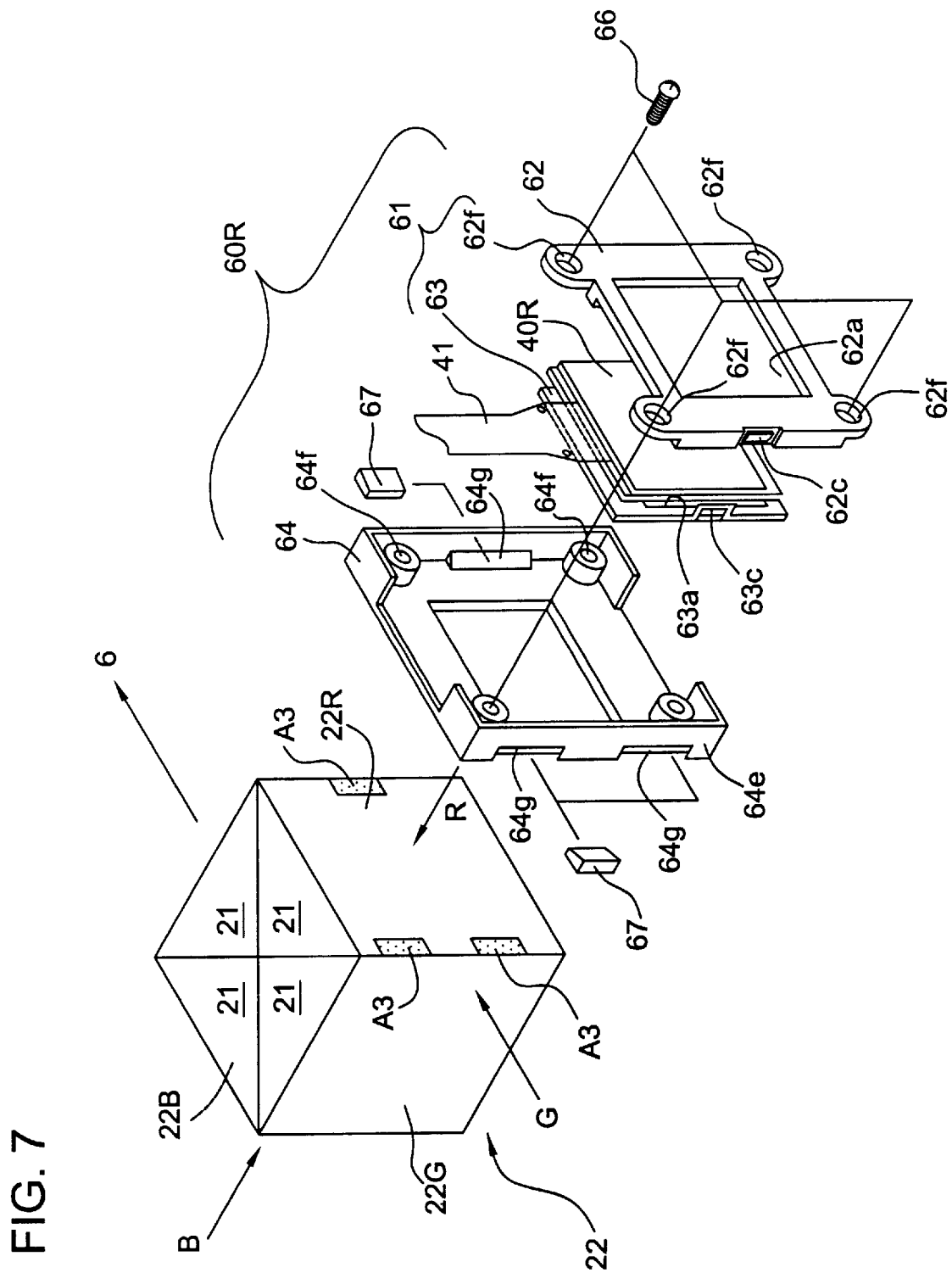

PROJECTION DISPLAY DEVICE

BACKGROUND OF THE INVENTION

1. Field of the Invention

The present invention relates to a projection display device, which separates white light from a light source into three-color lights of red, blue and green, modulates these color lights through a light valve composed of a liquid crystal panel or the like in response to image information, and recombines the modulated lights with an optical combining means to enlarge and project an image onto a projecting surface through a projection means.

2. Description of Related Art

A mechanism for fixing a light valve onto a prism body which is an optical combining means for a projection display device is disclosed in Japanese Patent Laid-Open Publication No. Hei 6-118368. In this fixing mechanism, the light valve is directly fixed onto the light incident face of the prism body with an adhesive.

The use of such a mechanism permits the omission of a pixel alignment mechanism between a plurality of light valves, which modulate the light which is particularly separated into red, green and blue, and a focussing mechanism, which adjusts the position of the formation face of each image which becomes an object within the focal depth of a projection lens. Accordingly, miniaturization and weight reduction of the optical system and reduction of the number of parts can be achieved in a projection display device.

However, when the light valve is directly bonded and fixed to the light incident surface of the prism body, it involves the following problems to be solved.

First, external light which enters from the external part of the device enters the light valve, there may be a possibility that each element may be operated by mistake. Moreover, direct handling of the light valve may cause its breakage, and this is not desirable. For example, direct chucking of the light valve, for bonding the light valve by a jig to the prism body may cause breakage at the edge, corner or the like of the light valve. Further, because the light valve is easily affected by static electricity, direct contact of the light valve for bonding it to the prism body is not desired.

In the light valve bonded to the prism body, part of the pixels may develop defects or the like as time passes by and the light valve changes. A light valve having defects must be replaced with a new one. However, it is difficult to exchange the light valve with defects with a new one since it is bonded and fixed to the prism body. It is not easy to detach the bonded and fixed light valve without damaging the light incident face of the prism body. Because of this, there are cases, for example, when exchanging the light valve with defects including the prism body, and this is not economical.

Furthermore, when the light valve is directly bonded and fixed to the prism body, the linear expansion coefficient of the light valve and the prism body are different so that thermal distortion may occur.

SUMMARY OF THE INVENTION

It is an object of the present invention to provide a projection display device having a fixing mechanism of a light valve, in which the light valve can be readily detached and is not easily affected by thermal distortion.

In order to solve the above-mentioned problems, in the present invention, a projection display device which separates light from a light source into a plurality of color lights, modulates each color light through a light valve in response to image information, and recombines the modulated lights of each color with an optical combining means comprising a prism body to enlarge and project an image onto a screen through a projection means, wherein the structures are used such that the periphery of the light valve is protected to prevent the invasion of external light, breakage and the like, and the light valve is detachably fixed on the prism body.

That is, the present invention includes a fixing frame plate fixed onto the light incident face of the prism body with an adhesive, a light valve frame plate for holding the light valve, a fixing means for detachably fixing the light valve frame plate onto the fixing frame plate, and a positioning means for positioning the light valve for the light incident face of the prism body. The fixing frame plate is formed by a material having a linear expansion coefficient ranging from ¼ to 4 times and preferably from ½ to 2 times the linear expansion coefficient of the prism body, and the light valve frame plate is formed by a material where the linear expansion coefficient ranges from ⅕ to 5 times, preferably from ½ to 2 times.

In the projection display device of the present invention having such a configuration, the light valve is held by the light valve frame plate. Furthermore, on the light incident face of the prism body, the fixing frame plate is attached and fixed, and on this fixing frame plate, the light valve frame plate in which the light valve is held is detachably fixed.

Accordingly, since the light valve frame plate protects the periphery of the light valve, the light valve will not break when fixing it onto the prism body or the like. Further, in a state where the light valve is built in the projection display device, because the periphery is covered by a light valve frame plate, there is no possibility that there may be an operation by mistake because of the entrance of the external light.

Furthermore, when some defects occur in the light valve as time passes by and the light valve changes, the light valve frame plate which holds the light valve can be detached from the fixing frame plate, which is bonded and fixed to the prism body, and it is good to fix the light valve frame plate which holds the new light valve to the fixing frame plate. Thus, since the light valve is not directly bonded and fixed to the prism body, the light valve can be easily replaced without damage to the front surface of the prism body.

When the fixing frame plate and the light valve frame plate have specified ranges of linear expansion coefficients compared to that of the prism body, distortion of these members by thermal expansion will not adversely affect focusing adjustment and alignment adjustment. Furthermore, if the prism body, fixing frame plate, and light valve frame plate define the linear expansion coefficient as E1, E2, and E3, respectively, it is most preferable that the linear expansion coefficient E1, E2, and E3 is the same, but at least, it is preferable that the relationship of E1<E2<E3 is established. By having a linear expansion coefficient, which is larger than that of the prism body and smaller than that of the light valve frame plate, the linear expansion coefficient of the fixing frame plate is positioned between the prism body composed of optical glass having a small linear expansion coefficient and the light valve frame plate formed by a material generally having a larger linear expansion coefficient, the effect of thermal distortion caused by the difference in linear expansion coefficient among the three things can be moderated.

The projection display device may further include a medial frame plate provided between the fixing frame plate and the light valve frame plate, the medial frame plate is fixed to the fixing frame plate by the fixing means, and is bonded and fixed to the light valve frame plate in a state positioned by the positioning means.

When the medial frame plate is provided, a temporary fixing means is provided between the medial frame plate and the light valve frame plate to temporarily fix the medial frame plate and the light valve frame plate. After temporarily fixing the medial frame plate and the light valve frame plate, these frame plates are then positioned by the positioning means, and the positioning means is preferably bonded and fixed.

The light valve frame plate has a first frame plate and a second frame plate, and can use the structure which can hold in a state where the light valve is inserted between these frame plates.

A plurality of wedge members can be used as the positioning means. The positioning means is used for adjusting the bonding and fixing position of the fixing frame plate which is fixed on the light incident face of the prism body and the fixing position of the light valve to the fixing frame. In general, the wedge members may be bonded and fixed to the respective members after the member positioning is completed.

A liquid crystal device can be used as the light valve. The present invention is particularly effective for a liquid crystal device which has inferior electrostatic resistance and can easily cause an erroneous operation due to the invasion of external light.

As the light valve, a light transmission type or a light reflection type exists. Generally, in the light reflection type of light valve, the color combining means also functions as a light separating means for separating light from the light source into a plurality of color lights.

As a projection display device, two kinds of devices exist: a front-surface projection display device which projects the projecting surface from the observing side and a rear-surface projection display device which projects the projecting surface from the opposite direction of the observing side. The present invention is applicable to either type of device.

When a dichroic prism is used as the prism body, the light valve is positioned and fixed onto the face of the dichroic prism using the fixing frame plate, light valve frame plate, fixing means, and the positioning means. It is considered that this fixing structure can be applied to a structure where a solid-state imaging element of a CCD or the like is positioned and fixed to the color separating prism in a camera or the like.

BRIEF DESCRIPTION OF THE DRAWINGS

FIG. 2A is a view showing the plan arrangement and FIG. 2B is a view showing the three-dimensional arrangement.

FIG. 7 is an assembly view showing another embodiment of a liquid crystal panel unit.

A projection display device in accordance with the present invention will now be described with reference to the drawings.

DESCRIPTION OF PREFERRED EMBODIMENTS

Figure 1:
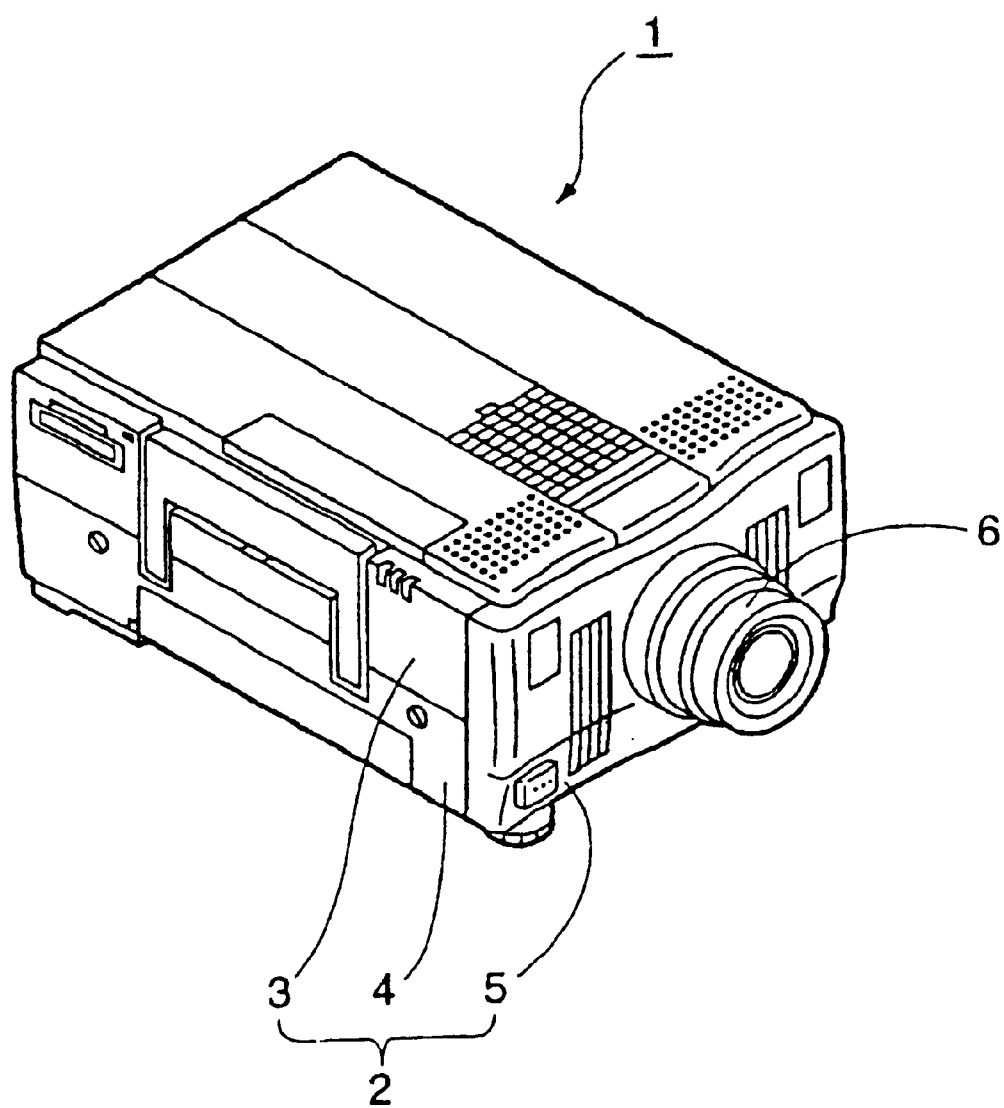
FIG. 1 is a perspective view of the appearance of a projection display device in accordance with the present invention.

FIG. 1 shows the appearance of a projection display device in accordance with the present invention. The projection display device 1 of this example has an exterior case 2 which has a rectangular parallelepiped formation. The casing 2 is basically structured by an upper case 3, a lower case 4, and a front case 5, which defines the front face of the device. The top of a projection lens unit 6 protrudes from the central portion of the front case 5.

Figure 2A:
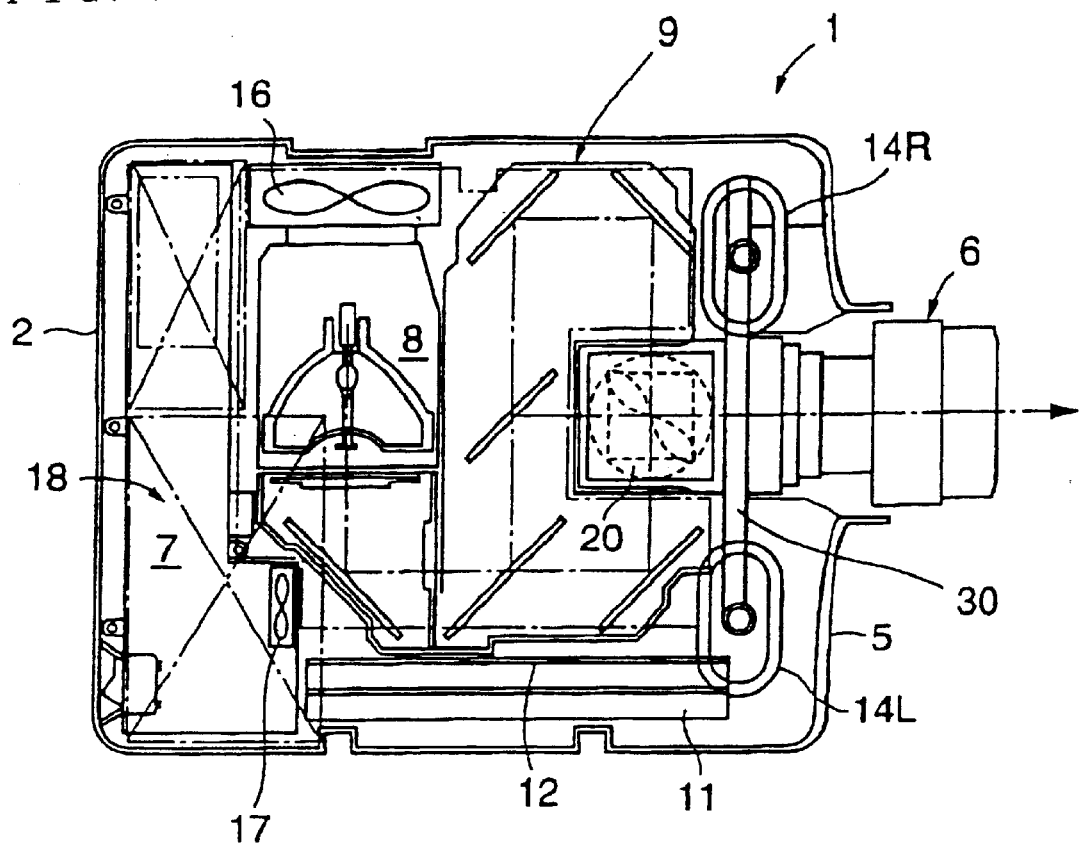
FIGS. 2A and 2B are views showing the arrangement of each part of the internal part of the device of FIG. 1.
Figure 2B:
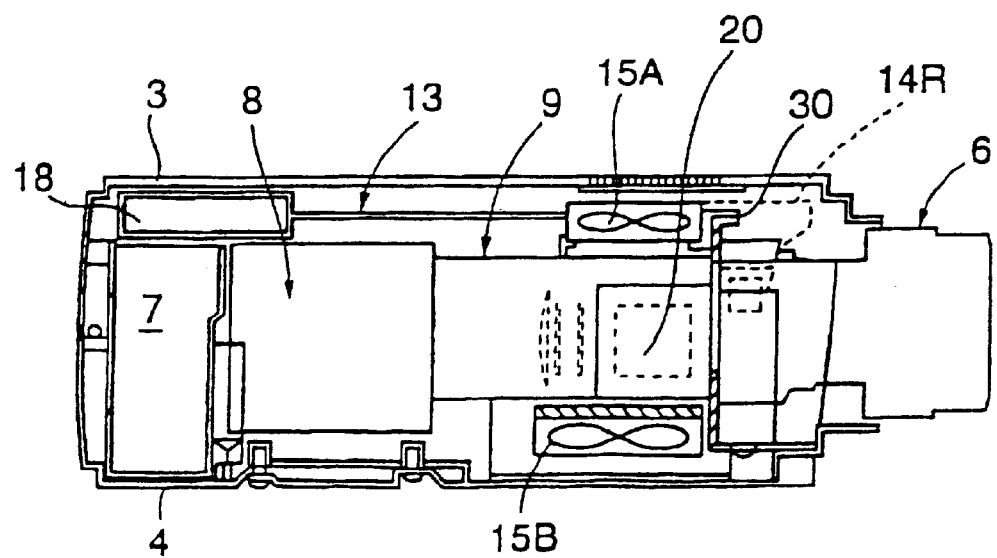

FIG. 2 shows the arrangement of each structural part in the internal part of the exterior case 2 of the projection display device 1. As shown in this figure, power source unit 7 is arranged in the rear edge side of the internal part of the exterior case 2. A light source lamp unit 8 and an optical lens unit 9 are placed in a position more adjacent to the front side of the device. The base edge side of the projection lens unit 6 is positioned in the center of the front side of the optical lens unit 9. Meanwhile, in another side of the optical lens unit 9, an interface board 11 holding an I/O interface circuit toward the front and back direction of the device is arranged, and a video board 12 holding a video signal processing circuit is arranged parallel to this. Further, a control board 13 for controlling the drive of the device is placed in the upper side of the light source lamp unit 8 and the optical lens unit 9. Speakers 14R and 14L are arranged, respectively, at the left and right corners of the front edge side of the device.

An intake fan 15A for cooling is provided in the center of the top face side of the optical lens unit 9, and a circulating fan 15B to form a circulating flow for cooling is provided in the center of the bottom face side of the optical lens unit 9. Further, a ventilating fan 16 is provided in the side surface of the device which is the rear surface side of the light source lamp unit 8. Furthermore, in the position facing the edge of boards 11 and 12 in the power unit 7, an auxiliary cooling fan 17 to attract air flow for cooling into the power unit 7 from the intake fan 15A is arranged.

A floppy disk driving unit (FDD) 18 is arranged in the position of the left side of the device just above the power unit 7.

Figure 3A:
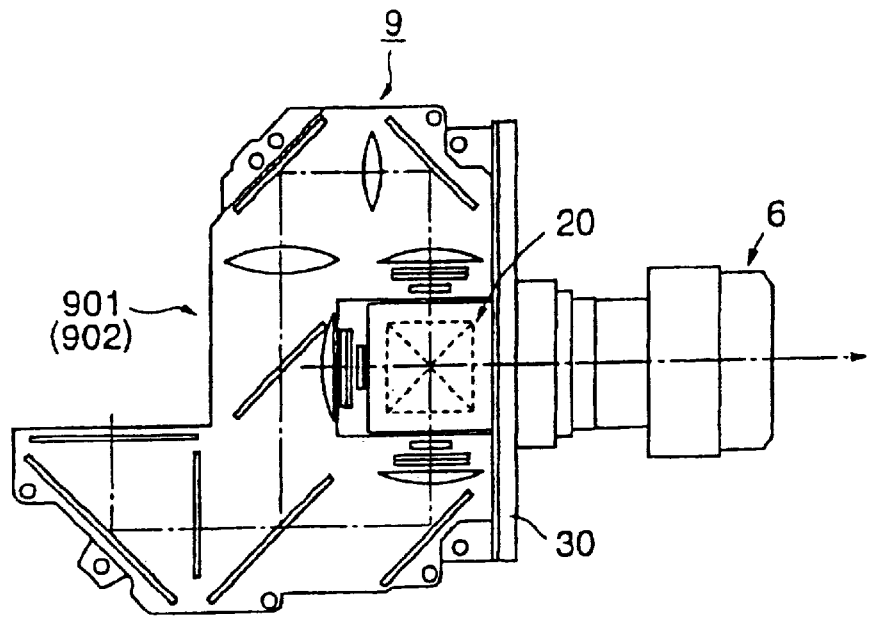
FIG. 3A is a view showing by taking parts of an optical lens unit and a projection lens unit out.

FIG. 3A shows an optical lens unit 9. As shown in this figure, in the optical lens unit 9, optical elements other than a prism unit 20 which structures the color combining means are interposed and held between upper and lower light guides 901 and 902 from upper and lower. The upper and lower light guides 901 and 902 are fixed to the sides of the upper case 3 and the lower case 4 by fixing screws, respectively, and fixed to the side of the prism unit 20 by the fixing screws just as described earlier.

The prism unit 20 is fixed to the rear face of a thick head plate 30, which is a die-cast plate, by fixing screws. The base edge side of the projection lens unit 6 is also fixed to the front face of the head plate 30 by the fixing screws. Accordingly, this example has a structure so that, the prism unit 20 and the projection lens unit 6 are fixed so as to integrate with the head plate 30 interposed therebetween. Both parts are integrated with the highly rigid head plate 30 interposed therebetween. Therefore, dislocation of these units will not occur even if the projection lens unit 6 is affected by an impact.

Figure 3B:
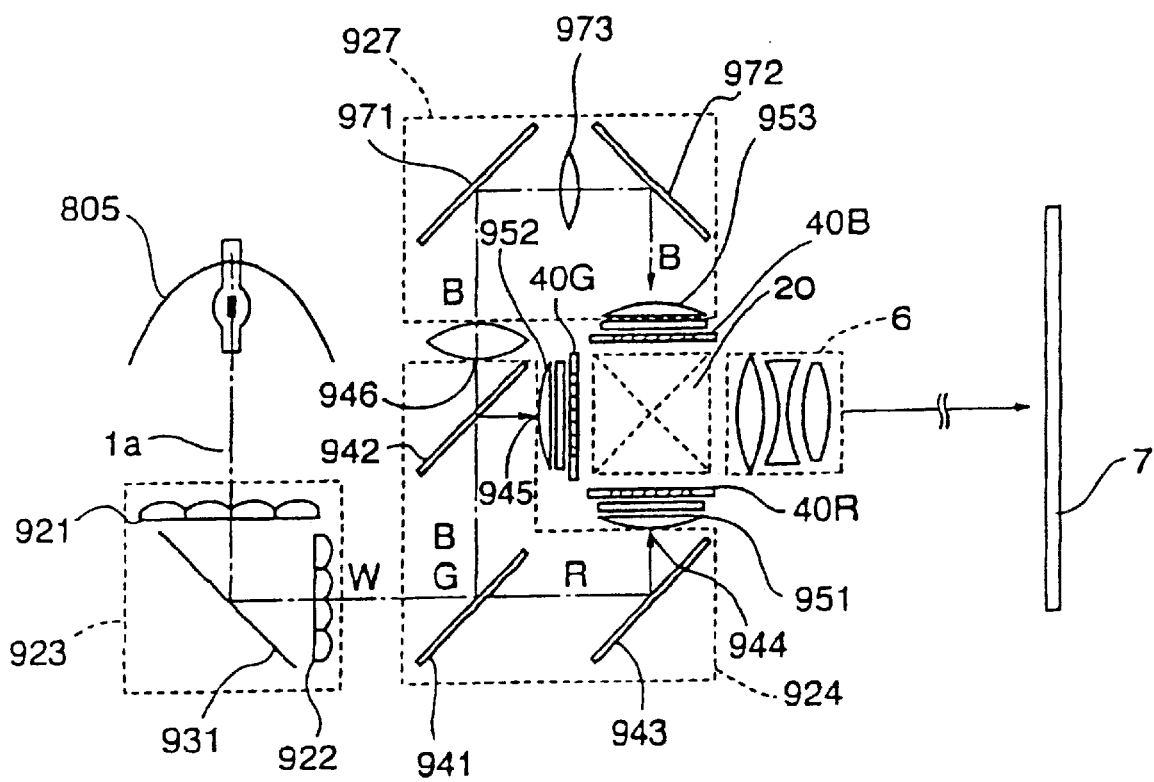
FIG. 3B is a schematic view of an optical system.

FIG. 3B shows a schematic view of an optical system assembled in the projection display device 1. The optical system in this example is structured by said light source lamp 805, an illumination optical system 923 having integrator lenses 921 and 922 which are uniformly illuminating optical elements, a color separating optical system 924 which separates a white color light W which is emitted from the illumination optical system 923 into each color light R, G, and B of red, green, and blue, three liquid crystal panels 40R, 40G and 40B as light valves for modulating each color light, the prism unit 20 as a color combining optical system which recombines the modulated color light, and the projection lens unit 6 which enlarges and projects the combined light onto the projection surface. Furthermore, among each color light which was separated by the color separating optical system 924, a light guide system 927 is provided to lead the blue color light B to the corresponding liquid crystal panel 40B.

As a light source lamp 805, a halogen lamp, a metal halide lamp, and a xenon lamp or the like can be used. The uniformly illuminating optical system 923 has a reflection mirror 931 and perpendicularly bends the central optical axis 1a of the light emitting from the light source lamp 805 toward the front direction of the device. The reflection mirror 931 is interposed and the integrator lenses 921 and 922 are arranged in a state which is perpendicular to back and front.

The color separating optical system 924 is structured by a blue/green reflecting dichroic mirror 941, a green reflecting dichroic mirror 942, and a reflection mirror 943. First, the blue color light B and the green color light G in the white color light W are perpendicularly reflected by the blue/green reflecting dichroic mirror 941 and go toward the side of the green reflecting dichroic mirror 942. The red color light R passes through this mirror 941, is perpendicularly reflected by the reflecting mirror 943 of the back side, and is emitted to the prism unit 20 from an emitting section 944 of the red color light. In the blue and green lights B and G reflected by the mirror 941, only the green color light G is perpendicularly reflected by the green reflecting dichroic mirror 942 and is emitted from the emitting section 945 of the green color light to the prism unit 20. The blue color light B which passes through this mirror 942 is emitted from the emitting section 946 of the blue color light to the side of a light guide system 927. In this example, the distances from the emitting section of the white color light of the uniformly illuminating optical elements to the emitting sections 944, 945, and 946 of each color light in the color separating optical system 924 are all equal to each other.

Collecting lenses 951, 952 and 953 are arranged in the emitting sides of the emitting sections 944, 945 and 946, respectively, of the color light of the color separating optical system 924. Therefore, each color light which was emitted from each emitting section are collimated by these collecting lenses 951, 952 and 953.

The lights R and G of the red and green color among each collimated color light R, G, and B are incident on the liquid crystal panels 40R and 40G and are modulated, and the image information corresponding to each color light is added. That is, these liquid crystal panels are controlled by switching in response to the image information by an undepicted driving means. By this, the modulation of each color light which passes through this is performed. A publicly-known means can be used as-is for a driving means like this. Meanwhile, the blue color light B is led to the corresponding liquid crystal panel 40B via the light guide system 927, and at this point, similarly modulated in response to the image information. The liquid crystal panel of this example can use, for example, polysilicon thin film transistors (TFT) which was used as a switching element.

The light guide system 927 is structured by an incident-side reflection mirror 971, an emitting-side reflection mirror 972, a medial lens 973 provided therebetween, and a collecting lens 953 provided in front of the liquid crystal panel 40B. The optical path length of each light, that is, the distance from the light source lamp 805 to each liquid crystal panel is that the blue color light B becomes the longest. Therefore, the light amount loss of this light becomes the largest. However, intervention of the light guide system 927 can control the light amount loss.

Next, each color light modulated through each of the liquid crystal panels 40R, 40G and 40B is incident on the color combining optical system and recombined here. In this example, by using the prism unit 20 which is structured by a dichroic prism as mentioned earlier, a color combining optical system is structured. The recombined color image here is enlarged and projected on the projecting surface 7 which is in a predetermined position through the projection lens unit 6.

Figure 4:
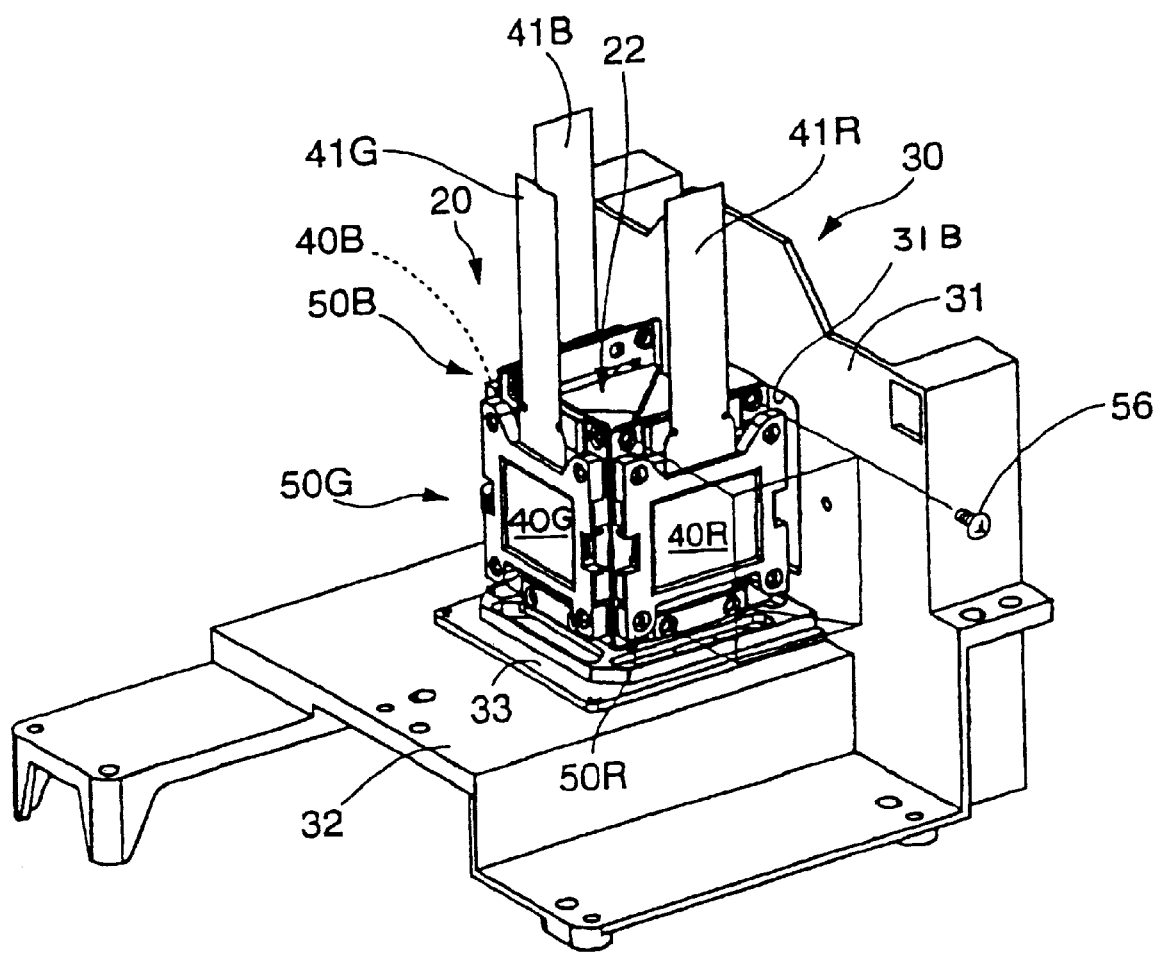
FIG. 4 is a partial perspective view showing by taking out the parts of a head plate, and a prism unit and a liquid crystal panel unit held thereon.

FIG. 4 shows a head plate 30 and a prism unit 20 attached to the rear face. As shown in the figure, the head plate 30 is essentially structured by a vertical wall 31 extending in the vertical position toward the width direction of the device and a bottom wall 32 extending horizontally from the bottom edge of the vertical wall 31. The vertical wall 31 is provided with a rectangular opening 31B to transmit the emitting light from the prism unit 20. Furthermore, the vertical wall 31 has many reinforcing ribs to enhance its rigidity. The prism unit 20 and the projection lens unit 6 are fixed in a state where the vertical wall 31 is interposed therebetween (refer to FIG. 3A). Therefore, since integration of these are high and it is extremely rare that a mutual position shift may occur even though there is an impact effect.

The prism unit 20 is attached to the bottom wall 32 of the head plate 30. The prism unit 20 is structured by a rectangular-parallelepiped prism combining body 22 which is formed by bonding four prisms 21 (see FIG. 5) having a cross section of an isosceles right triangle. The bottom of the prism combining body 22 is fixed by the means of an adhesive or the like to the front surface of the prism supporting plate 33, which is fixed to the bottom wall 32 of the head plate. The liquid crystal panel units 50 having the same configuration are attached to three sides, respectively, which function as the light incident faces on the side surfaces of the prism combining body 22. The liquid crystal panels 40R, 40G and 40B are held in these liquid crystal panel units 50 (50R, 5OG and 50B), respectively (in FIG. 4, only the liquid crystal panel 40R and 40G are shown).

Figure 5:
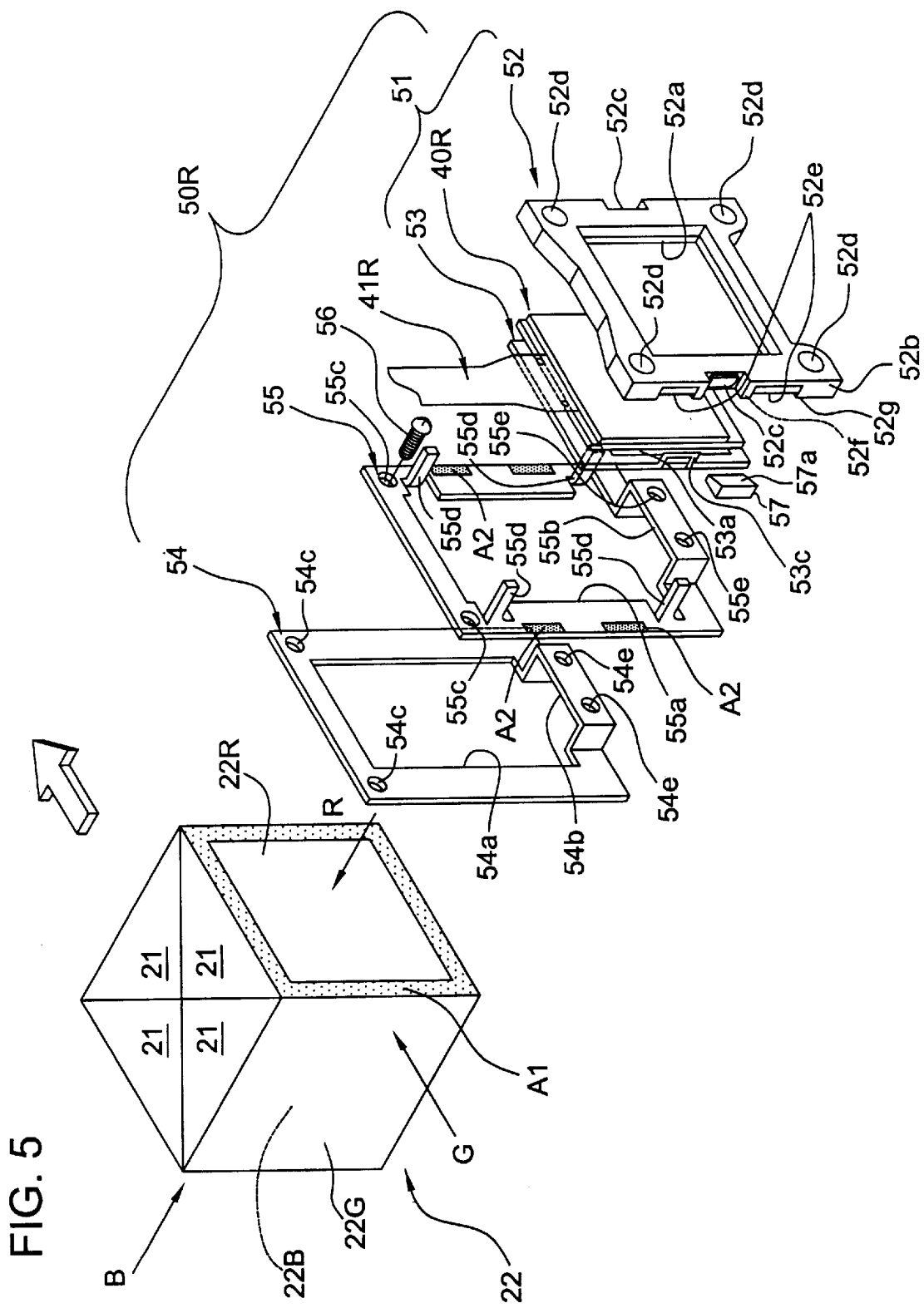
FIG. 5 is an assembly view showing the structure of the liquid crystal panel unit of FIG. 4.

FIG. 5 is an assembly view of each structural part of the unit 50R in which the liquid crystal panel 40R is held in the liquid crystal panel units 50. The configuration for fixing the liquid crystal panel to the prism combining body 22 will now be described with reference to the drawing.

First of all, as shown in FIG. 5, the liquid crystal panel unit 50(50R) is provided with a light valve frame plate 51 holding the liquid crystal panel 40R. The light valve frame plate 51 is provided with a first frame plate 52 and a second frame plate 53, and is held in a state where the liquid crystal panel 40R is interposed between these frame plates 52 and 53.

Meanwhile, the liquid crystal panel unit 50 is provided with a fixing frame plate 54, which is fixed to the light incident face 22R of the prism combining body 22 with an adhesive. The light valve frame plate 51 is detachably fixed to the fixing frame plate 54 through the medial frame plate 55.

Each part will now be described in detail. The first frame plate 52 of the light valve frame plate 51 has a rectangular opening 52a for the optical path, and a certain thickness of the surrounding wall 52b is formed in the four surroundings. The second frame plate 53 also has a rectangular opening 53a for the optical path. The second frame plate 53 is the size of being inserted inside of the surrounding wall 52b of the first frame plate 52. Furthermore, an engaging protrusion 53c is formed in the center of the left and right edges of the second frame plate 53. An engaging groove 52c in which the engaging protrusion 53c is inserted is formed in the center of the left and right surrounding walls 52b of the first frame plate 52. Therefore, they are mutually layered in a state where the liquid crystal panel 4OR is interposed between the first and second frame plates 52 and 53, and if the engaging protrusion 53c is inserted to a corresponding engaging groove 52c, the light valve frame plate 51 is fabricated in which the liquid crystal panel 40R is inserted.

Next, the medial frame plate 55 has a rectangular shape and has a size which is substantially equal to that of the first frame plate 52 of the light valve frame plate 51 and has a rectangular opening 55a for the optical path. The medial frame plate 55 has engaging protrusions 55d extending perpendicularly from the frame plate front surface at four corners of the rectangular opening 55a. Meanwhile, in the first frame plate 52 of the light valve frame plate 51, in the position corresponding to each engaging protrusion 55d, the engaging holes 52d which can be inserted into them are formed. Therefore, if the engaging protrusion 55d of the medial frame plate 55 is mutually laminated with each engaging hole 52d of the light valve frame plate 51, a temporary fixing state where each engaging protrusion 55d is inserted to each engaging hole 52d is formed.

Meanwhile, the fixing frame plate 54 is a frame plate in a rectangular shape where a rectangular opening 54a for the light path was formed. The rear face of the fixing frame plate 54 is fixed to the light incident face 22R of the prism combining body 22 by an adhesive layer A1 as described later. The adhesive layer A1 is formed around the periphery of the light incident face 22R. The fixing frame plate 54 has screw holes 54c at the upper left and right corners of the fixing frame 54, and the medial frame plate 55 also has screw holes 55c corresponding to these screw holes 54c.

Furthermore, at the lower frame portion of the fixing frame plate 54 is a protruding frame 54b which protrudes toward the medial frame plate 55. The lower frame portion of the medial frame plate 55 is a protruding frame 55b so that the protruding frame 54b is inserted from the rear face. These protruding frames 54b and 55b support the light valve frame plate 51. Moreover, each protruding frame 54b or 55b has two screw holes 54e and 55e at the left and right sides thereof, respectively.

Thus, in the fixing frame plate 54 and medial frame plate 55, screw holes 54c, 54e, and 55c, 55e are formed in mutually corresponding positions, and these are tightened and fixed by four flat screws 56 which are screwed into these screw holes. That is, the medial frame plate 55 is screwed to the fixing frame plate 54 attached to the prism combining body 22.

Furthermore, each liquid crystal panel unit 50 has four wedge members 57 as positioning means. Only one wedge member is shown in FIG. 5. The respective two wedge member guide surfaces 52e, which the inclined surface 57a of the wedge member 57 contacts, are formed in the right and left surrounding wall parts of the first frame plate 52 of the light valve frame plate 51. As described before, after temporarily fixing the light valve frame plate 51 to the medial frame 55, four wedge members 57 are driven in the left and right sides of the first frame plate 52, and the liquid crystal panel 40R is positioned by adjusting the driven amount of the wedge members 57.

It is preferable that the fixing frame plate 54 be composed of a material having a linear expansion coefficient ranging from ¼ to four times and more preferably from ½ to two times the linear expansion coefficient of the prism combining body 22. It is preferable that the light valve frame plate 51 be composed of a material having a linear expansion coefficient ranging from ⅕ to five times and more preferably from ½ to two times that of the linear expansion coefficient of the fixing frame plate 54. Further, the medial frame plate 55 preferably has a linear expansion coefficient which lies between those of the fixing frame plate 54 and the light valve frame plate 51 or is equal to that of either the fixing frame 54 or the light valve frame 51. When the linear expansion coefficients of the fixing frame plate 54, the medial frame plate 55 and the light valve frame plate 51 lie within the above-mentioned ranges, distortion of said each member by thermal expansion can be in the range of not adversely affecting the focus and alignment adjustments.

The light valve frame plate 51, the first frame plate 52 and the second frame plate 53, the medial frame plate 55, and the fixing frame plate 54 are not particularly limited as long as they satisfy the range of the aforementioned linear expansion coefficients. They can be structured by resins, metals, or various composite materials.

The fixing frame plate 54 is composed of, for example, a metal or a metal composite material including a metal. Examples of the preferred metals include iron, aluminum and copper, and alloys thereof, e.g. brass, aluminum bronze and stainless steel, in view of easiness of formation, specific gravity, adhesiveness in addition to the linear expansion coefficient.

The light valve frame plate 51 is composed of, for example, a resin or a resin composite material. Examples of the preferred resins include polypropylene, polyphenylene sulfide, polycarbonate, acrylonitrile-butadiene-styrene (ABS) resins, polystyrene, acrylonitrile-styrene (AS) resin, polyacetal, and polyethylene terephthalate (PET), or composite materials thereof, when considering the easiness of formation, specific gravity, or the like in addition to the linear expansion coefficient. The compound material includes granular fillers, e.g. calcium carbonate and barium sulfate; plate fillers, e.g. talc and mica; and needle fillers, e.g. glass fiber, carbon fiber, calcium silicide, boron fiber, and metal fiber by mixing with resin. If the compound resin material like this is used, the linear expansion coefficient can be close to that of glass or metal, compared to general resin materials.

The medial frame plate 55 is composed of the metal, the resin or a composite material thereof, which were above mentioned.

The following shows the examples of several materials of each structural member along with linear expansion coefficients. The linear expansion coefficient is the numerical value $(x) \times 10^{-6}$ cm/° C. which is shown in parenthesis.

For the prism combining body:
Optical glass BK-7 (7.5)

For the fixing frame plate and the medial frame plate:

Iron (11.8)

Zinc-plated iron (11.8)

Fernico[iron:54%, nickel:31%, and cobalt:15%] (5.0)

Copper (16.5)

Brass (17.5)

Chromium-plated brass (17.5)

Aluminum (23.1)

Aluminum bronze (15.9)

For the light valve frame plate:

Polyphenylene sulfide (PPS)+carbon fiber (43)

PPS+40% glass fiber (62)

PPS+calcium carbonate (24)

Polycarbonate (PC)+filler (32)

PC+glass fiber (37)

Polypropylene (PP)+40% talc (43)

PP+30% glass fiber (43)

PP+20% glass fiber (53)

PP+30% talc (54)

PPS+30% glass fiber (56)

PP+barium sulfide (65)

PP+10% glass fiber (66)

PP+10% calcium silicide (93)

PP block copolymer (120)

Acrylic resin (80 to 100)

Ceramic (8.5)

The results of heat shock tests using test pieces will now be described.

a. Testing Method (1) A UV curable adhesive TB3062E (manufactured by Three Bond Co., Ltd.) was applied, and the first test piece is bonded to the second test piece to form a sample. Materials for the test pieces are shown in Tables 1 to 3. Furthermore, the test pieces have the following sizes:

First test piece;

length: 6 mm, width: 40 mm, thickness: 1 mm

Second test piece;

length: 40 mm, width: 40 mm, thickness: 5 to 6 mm (2) The sample is placed in a thermostatic chamber at the temperature 65° C. for 1 hour and 30 minutes.

(3) The sample is placed in a thermostatic chamber at the temperature −25° C. for 1 hour and 30 minutes.

(4) The steps (2) and (3) are repeated 30 cycles.

b. Evaluating Method and the Results

When deterioration of the adhesive, specifically cracks of the adhesive-agent layer(s), abnormality of partial separation of the adhesive-agent layer or the like is not visually observed, the sample was evaluated as "good," whereas when deterioration is observed, the sample was evaluated as "bad." The results of the evaluation are shown in Tables 1 to 3.

Table 1 shows the combinations of an optical glass material which forms the prism combining body and metals which form the fixing frame plate. Tables 2 and 3 shows the combinations of metals which form the fixing frame plate and resins or resin composite materials which form the light valve frame plate. Furthermore, tables 1 to 3 also include the ratio of the linear expansion coefficient of the first test piece to that of the second test piece.

TABLE 1

| Second test piece | | Optical glass BK-7 | |
|---|---|---|---|
| First test piece | Iron | Aluminum | PPS + 30% CF |
| Ratio of linear expansion coefficient | 1.57 | 3.08 | 5.73 |
| 5 cycles | Good | Good | Bad |
| 10 cycles | Good | Good | Bad |
| 30 cycles | Good | Bad | Bad |

CF: Carbon Fiber

TABLE 2

| Second test piece | | Iron | |
|---|---|---|---|
| First test piece | PPS + 30% CF | PP + 20% GF | PPS + 40% GF |
| Ratio of linear expansion coefficient | 3.64 | 4.49 | 5.25 |
| 5 cycles | Good | Good | Bad |
| 10 cycles | Good | Good | Bad |
| 30 cycles | Good | Bad | Bad |

GF: Glass Fiber

TABLE 3

| Second test piece | | Aluminum | |
|---|---|---|---|
| First test piece | PPS + 30% CF | Acrylic resin | PC |
| Ratio of linear expansion coefficient | 1.86 | 4.32 to 3.46 | 5.97 to 6.19 |
| 5 cycles | Good | Good | Good |
| 10 cycles | Good | Good | Bad |
| 30 cycles | Good | Bad | Bad |

PC: Polycarbonate

The liquid crystal panel unit 50 is fixed onto the light incident face 22R of the prism combining body 22 as follows. First of all, a light valve frame plate 51 holding a liquid crystal panel 40R is prepared. Then, the fixing frame 54 is positioned on the face 22R of the prism combining body 22 and fixed with an adhesive agent layer A1. Examples of adhesive agents of the adhesive agent layer A1 include acrylic resin, epoxy resin, urethane resin or the like. Furthermore, light-curable adhesives and particularly UV-curable adhesives, which are cured by ultraviolet rays or visible rays, are preferably used because such adhesives are not affected by heat during the curing. The adhesive agent preferably has a glass transition temperature of 50° C. to 200° C. and an elongation of 100% to 400%. The adhesive agents having such characteristic values can absorb thermal distortion caused by the difference of the linear expansion coefficients of the prism combining body 22 and the fixing frame plate 54 and, thus, can maintain a stable connecting state for a long period.

It is preferable that a primer be applied in order to improve adhesiveness although, as described before, UV curable type adhesive agent can be used as an adhesive agent to attach and fix the fixing frame plate 64 with the prism combining body 22. That is, in the prism combining body 22, the light incident face 22R of the red color light faces the light incident face 22B of the blue color light. Since the blue color light has a short wavelength, it may partially pass through the reflection film of the prism combining body 22 and reach the light incident face 22R of the red color light at the opposite side. When the backlight like this incidents the liquid crystal panel 40R, an error operation occurs. A filter is generally provided on the light incident face 22R of the red color light to shield it from backlight like this.

Generally, the filter is provided only on the light incident face 22R of the red color light since the effects of the backlight of the blue color light is the most significant. However, when the effects by the backlight of other lights are large, it does not apply to this case. Filters can be disposed on other faces or on a plurality of faces.

However, if this kind of filter exists, ultraviolet rays are shaded by this kind of filter, and the insufficient part of the ultraviolet ray with the ultraviolet ray curing adhesive agent to attach and fix the fixing frame plate 54 with the incident faces 22R, 22G, and 22B of the prism combining body 22 may occur. In order to securely bond the fixing frame plate 54 to the light incident face 22R by avoiding the problems, as described above, it is preferable that the primer be applied to these attaching faces and an anaerobic adhesive be used together. Such treatment is also useful for the light incident face provided with no filter.

Moreover, the use of the light curing type adhesive agent was described as an adhesive agent, and other types of adhesives may be used. For example, if the fixing frame plate 54 or the wedge members 57 can be attached and fixed by using a hot-melt type of adhesive, it is not necessary to consider the above problem of the filter.

Next, the medial frame plate 55 is positioned on the surface of the fixing frame plate 54 which is attached and fixed with four screws 56. After that, the light valve frame plate 51 holding the liquid crystal panel 40R is positioned on the medial frame 55 and is temporarily fixed to it. That is, each engaging protrusion 55d of the medial frame plate 55 mates with the respective engaging hole 52d of the light valve frame plate 51 so that the light valve frame plate 51 pushed into the medial frame plate 55 in this state.

After this, the liquid crystal panel 40R is positioned relative to the face 22R of the prism combining body 22 by using the wedge members 57 as positioning means. That is, four wedge members 57 are inserted between the light valve frame plate 51 and the medial frame plate 55 which are temporarily fixed along the wedge member guide faces 52e formed in the first frame 52. The driven amount of each wedge member 57 is adjusted for alignment and focusing of the liquid crystal panel 40R.

After positioning of the liquid crystal panel 40R, these wedge members 57 are attached and fixed to the light valve frame plate 51 and the medial frame plate 55 which are the members of the subject positioning with the adhesive layer A2 therebetween. Preferable adhesives are similar to those for adhesion between the prism combining body 22 and the fixing frame plate 54 which were described above.

The positioning and fixing processes of the wedge members 57 will now be described in detail by following the fixing procedure.

First of all, the focal surface of the liquid crystal panel 40G mates with the focal surface of the projection lens 6 with an adjusting device only for this case. In this state, as described earlier, in a space where the engaging protrusions 55d of the medial frame plate 55 are formed by entering the engaging hole 52d of the light valve frame plate 51, for example, by putting the UV curing type of adhesive agent and irradiating UV, engaging protrusions 55d of the medial frame plate 55 are made to be hard and temporarily fixed. The ultraviolet rays are irradiated from the exposed end of each wedge member 57 and attached to the ultraviolet curing type adhesive to securely fix the relevant parts together with the medial frame plate 55 and the wedge member guide face 52e disposed in the first frame plate 52. Based on the liquid crystal panel 40G which is arranged in the center of liquid crystal panels 40G, 40R, and 40B, the liquid crystal panels 40R and 40B are also temporarily and securely fixed by the focus and pixel adjustments therebetween of the liquid crystal panels 40R and 40B just like above.

Furthermore, since temporary fixing is performed by setting the following in the adjusting device in a state where the prism combining body 22 and the projection lens 6 are fixed on the head plate 30, it is possible to perform the best adjustment according to the characteristics of each part. Moreover, chucking of the light valve frame plate 51 to the adjusting device is performed based on the outer shape of the first frame plate 52.

As the wedge member 57, a glass member can be generally used. However, when the first frame plate 52 is made of a resin, a linear expansion coefficient is larger than that of glass, so that the wedge member 57 can be readily detached from these frame plates due to the difference of the linear expansion coefficient or may be broken by a change in temperature in some cases. Accordingly, it is preferable that the wedge member 57 be made of a resin, for example, an acrylic resin in order to avoid such a problem. Furthermore, since the wedge member 57 by forming the wedge member 57 from the acrylic materials, it is possible to perform a forming process, its production costs can be significantly reduced compared with the glass member. Further, by using the material which transmits UV rays as a material of the wedge member 57, it is possible to use a light curing adhesive agent as an adhesive agent to attach and fix the wedge member 57 i n which the increasing temperature is small and the curing time is short.

Liquid crystal panel units 50 holding the liquid crystal panels 4OG and 40B, respectively, other than the liquid crystal panel 40R, have the same configuration, hence the description for them will be omitted.

As shown in FIG. 4, liquid crystal panels 50 are fixed on their respective three faces 22R, 22B and 22G of the prism combining body 22 in such a manner. In this figure, the members which extend upward from their respective liquid crystal panels 50 are flexible wiring cables 41R, 41G and 41B.

The liquid crystal panel unit 50 having the abovementioned configuration has the following advantages.

First, the rectangular light valve frame plate 51 surrounds and protects the liquid crystal panel 40R. Therefore, the liquid crystal panel 4OR can be mounted on the prism combining body 22 without direct contact of the liquid crystal panel 40R. Because of this, the liquid crystal panel 40R is prevented from breakage by touching other parts or the like. Furthermore, since the liquid crystal panel 40R surrounded by the frame plate 51, it is shielded from external light, no malfunction of the liquid crystal panel 40 will occur due to the external light.

Second, the light valve frame plate 51 holding the liquid crystal panel 4OR is fixed to the face 22R of the prism combining body 22 with the fixing frame plate 54 fixed to the face 22R by an adhesive and the medial frame plate 55 screwed to the fixing frame plate 54 therebetween. Therefore, for example, when defects occur in the liquid crystal panel 40R, the replacement can be performed by a simple operation of loosening the screws 56. Furthermore, since the liquid crystal panel 4OR is not fixed directly to the prism combining body 22, the prism combining body 22 will not be damaged during the replacement.

Third, the light valve frame plate 51 holding the liquid crystal panel 40R is temporarily fixed to the medial frame plate 55. After the forming of the temporary fixing state, the liquid crystal panel 4CR is positioned relative to the face 22R of the prism combining body 22 by using the wedge members 57. Thus, because it is possible to form the temporary fixing state, it is possible to easily perform the positioning operation which uses the wedge members 57.

Fourth, by setting the linear expansion coefficient of the material which structures the fixing frame plate 54 and the medial frame plate 55 for the prism combining body 22, in a specific range and the linear expansion coefficient of material which structures the light valve frame plate 51 for the linear expansion coefficient of the fixing frame plate 54 and the medial frame plate 55 in a specified range, thermal distortion of each member can be set in a range where there is no effect on the accuracy of alignment and focus.

Figure 6:
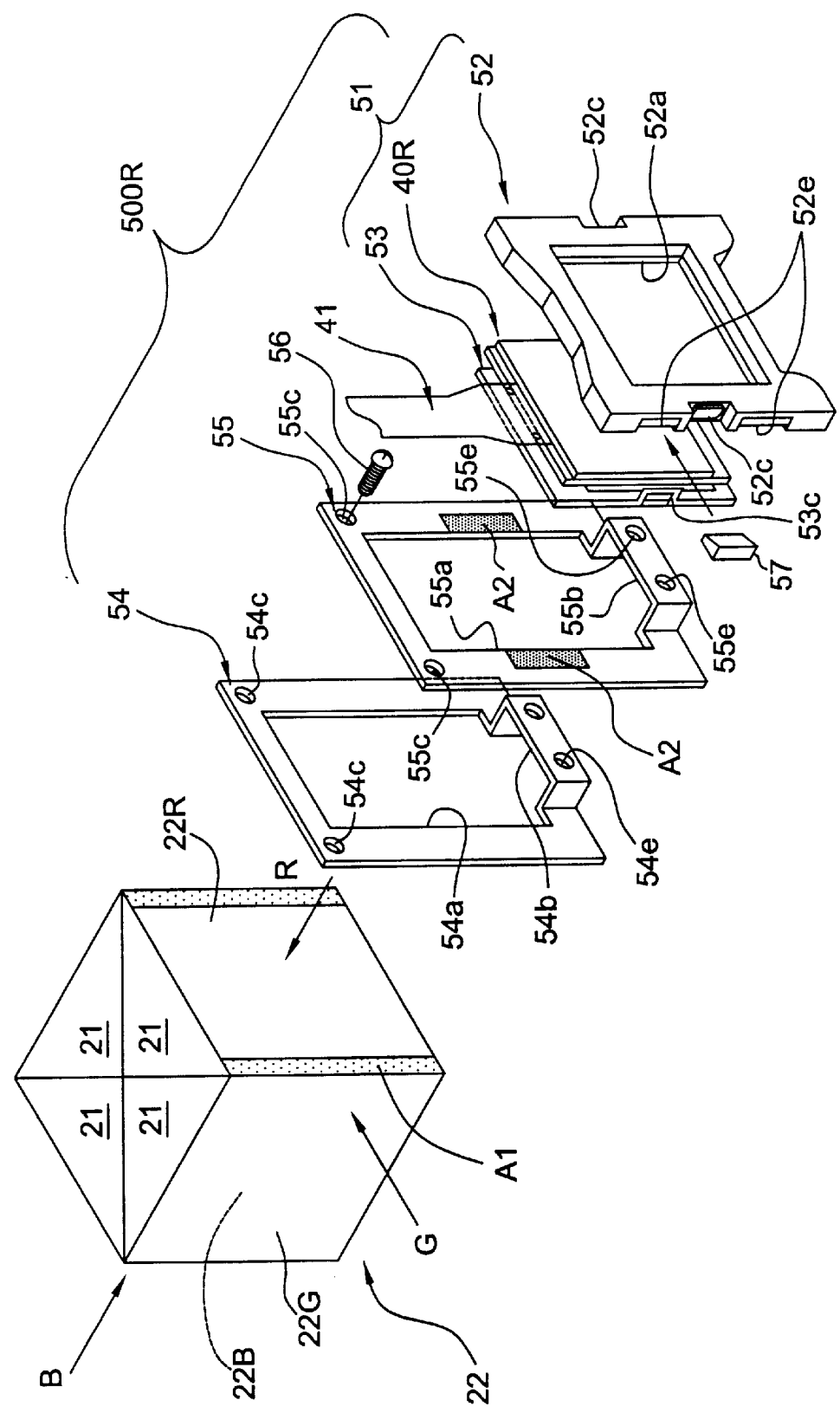
FIG. 6 is an assembly showing a modification example view of the liquid crystal panel unit of FIG. 5.

If temporary fixing of the light valve frame plate 51 to the medial frame plate 55 is not required, as shown in FIG. 6, the temporary fixing mechanism formed between the light valve frame plate 51 and the medial frame plate 55 can be omitted. That is, the engaging holes 52*d* formed in the side of the light valve frame plate 51 and the engaging protrusions 55*d* formed in the side of the medial frame plate 55 may be omitted, as shown in FIG. 5. The rest of the configuration is the same as in FIG. 5.

A liquid crystal panel unit 500R having the configuration shown in FIG. 6 also has the above-mentioned first, second and fourth advantages which are achieved by the liquid crystal panel unit 50 (50R) shown in FIG. 5.

FIG. 7 shows another embodiment of the liquid crystal panel unit. The liquid crystal panel unit 60 (60R) also has a light valve frame plate 61 holding the liquid crystal panel 40R, and a fixing frame plate 64 which is fixed to the face 22R of the prism combining body 22 with an adhesive layer A3 therebetween. No medial frame plate is provided in this embodiment, hence the light valve frame plate 61 is directly screwed to the fixing frame plate 64. The rest of the configuration is the same as in FIG. 5.

The light valve frame plate 61 has the same configuration as the above-mentioned light valve frame plate 51, and is provided with a first frame plate 62 and a second frame plate 63. The liquid crystal panel 40R is interposed therebetween. The first and second frame plates 62 and 63 have an engaging claw 62*c* and an engaging hook 63*c*, respectively, to hold the first and second frame plates 62 and 63 in an engaging state. The first and second frame plates 62 and 63 also have rectangular openings 62*a* and 63*a*, respectively, for the optical path.

The fixing frame plate 64 has a shape where the surrounding walls 64 of a certain width are formed in the four surroundings of the rectangular frame body part. The light valve frame plate 61 is insertable inside of the surrounding walls 64*e*. Furthermore, the screw holes 64*f* are provided at the four corners inside of the surrounding walls 64*e*. The first frame plate 62 of the light valve frame plate 61 corresponding to these screw holes also has screw holes 62*f* at the four corners. The light valve frame plate 61 is fixed to the fixing frame plate 64 with screws 66.

The two wedge member guide faces 64*g* are provided at the upper and lower portions of one of the surrounding walls 64*e* of the fixing frame plate 64, and one wedge member guide face 64*g* is provided at the central portion of the other side wall 64*e*. In other side surfaces, the wedge member guide face 64*g* is formed in the center of one place of the upper and lower direction.

In the liquid crystal panel unit 60R of this configuration, the light valve frame plate 61 is fixed to the fixing frame plate 64 with screws 66. Next, the liquid crystal panel unit 60R is positioned relative to the face 22R of the prism combining body 22. In this state, the three wedge members 67 are inserted into the wedge member guide face 64, and the three wedge members 67 are maintained so as to position by the surface tension of the adhesive agent of the UV curing type which is already applied to the contacting surface of the wedge member so that there will be no space. After the positioning of the wedge member 67 is performed by this, the UV rays are irradiated from the exposing edge face of the wedge member 67 and fixed by curing the adhesive agent. The adhesive is cured by UV irradiation from the exposed portions of the wedge members 67.

Wedge members 67 may be arranged at each position of the central position of both surrounding walls of side wall 64*e* of the fixing frame plate 64. Such a configuration can minimize the effects of thermal expansion and shrinkage in accordance of the temperature change when fixing frame plate 64 is large-sized and this improves the reliability.

The frame plate 61 also covers and protects the liquid crystal panel 40R in the liquid crystal panel unit 60 (60R) of this configuration. The frame plate 61 holding the liquid crystal panel 40R is screwed to the side of the fixing frame plate 64. Thus, the liquid crystal panel 40R is protected and external light does not enter. Moreover, the liquid crystal panel can be readily replaced by loosening the screws during the replacement. Furthermore, the surface of the prism combining body is protected from damage during the replacing operation. In addition, it is possible to control the thermal distortion due to the difference of the linear expansion coefficient of each member.

In the projection display device in accordance with the present invention as described above, the light valve is precisely positioned and fixed to the prism body; it is possible to control the shifted amount of the pixel alignment and precisely adjust the focus adjustment so that it is possible to easily improve the higher accuracy. In addition, since the prism body can be miniaturized in the configuration permitting replacement of the light valve, a small lightweight product with high reliability can be manufactured.

Furthermore, in the projection display device in accordance with the present invention, the light valve frame plate supports the light valve arranged on the light incident face of the prism body so as to protect the periphery of the prism body. Moreover, the light valve frame plate holding the light valve is detachably fixed to the fixing frame plate which is attached and fixed to the light incident face of the prism body. Therefore, according to the fixing mechanism of the light valve of the present invention, the periphery of the light valve is covered by the frame plates 62 and 64 and protected; hence the light valve will not be damaged during handling, and malfunction will not occur due to the entering of external light from the surroundings. In addition, the light valve can be readily replaced with a new one without damage to the prism body during the replacement.

Furthermore, along with the recent improvement of the light valve with high accuracy, the case in which the pixel is defective is considered, but even in that case, there are advantages such that it is possible to exchange only the light valve with defect, and other parts can be re-used.

Moreover, by setting the linear expansion coefficient of the fixing frame plate and the light valve frame plate in a specified range for the prism body and the fixing frame plate, respectively, it is possible to control the thermal distortion due to the difference of the linear expansion coefficient of each member and maintain alignment and focus with high accuracy.

We claim:

1. A projection display device, that includes a plurality of light valves that modulate a plurality of color lights in response to image information, and an optical combining device including a prism body that combines the modulated color lights, a projection system that enlarges and projects an image, said projection display device comprising:

a fixing frame plate fixed onto a light incident face of said prism body, a light valve frame plate that holds said light valve, a fixing member that fixes the light valve frame plate onto said fixing frame plate, and a positioning member that fixes said light valve relative to the light incident face of said prism body;

said fixing frame plate comprising a material having a linear expansion coefficient ranging from one quarter to four times a linear expansion coefficient of said prism body; and said light valve frame plate comprising a material having a linear expansion coefficient ranging from one-fifth to five times a linear expansion coefficient of said fixing frame plate.

2. The projection display device of claim 1, linear expansion coefficients E1, E2, and E3, of said prism body, said fixing frame plate, and said light valve frame plate, respectively, satisfying the relationship E1<E2<E3.

3. The projection display device of claim 1, said fixing frame plate comprising a material having a linear expansion coefficient ranging from one half to two times the linear expansion coefficient of said prism body.

4. The projection display device of claim 1, said light valve frame plate comprising a material having a linear expansion coefficient ranging from one half to two times a linear expansion coefficient of said fixing frame plate.

5. The projection display device of claim 1, said fixing frame plate comprising a metal or a composite material comprising a metal.

6. The projection display device of claim 1, said light valve frame plate comprising a resin or a composite material comprising a resin.

7. The projection display device of claim 1, said projection display device further comprising a medial frame plate provided between said fixing frame plate and said light valve frame plate, said medial frame plate being fixed to said fixing frame plate by said fixing member and being bonded to said light valve frame plate after being positioned by said positioning member.

8. The projection display device of claim 7, further comprising, a temporary fixing member between said medial frame plate and said light valve frame plate to temporarily fix said medial frame plate and said light valve frame plate.

9. The projection display device of claim 1, said positioning member comprising a plurality of wedge members which are fixed with an adhesive.

10. The projection display device of claim 9, said adhesive being a light-curable adhesive.

11. The projection display device of claim 1, said light valve frame plate comprising a first frame plate and a second frame plate, said light valve being held between said first frame plate and said second frame plate.

12. The projection display device of claim 1, said light valve being a liquid crystal light valve.

13. A light valve unit for positioning a light valve relative to the light incident face of a prism body, the light valve unit comprising:

a fixing frame plate for being fixed to a portion of said prism body with an adhesive;

a light valve frame plate for holding said light valve;

a fixing member that fixes said light valve frame plate on said fixing frame plate; and a positioning member that fixes said light valve relative to said prism body; said fixing frame plate comprising a material having a linear expansion coefficient ranging from one quarter to four times a linear expansion coefficient of said portion of said prism body.

14. The light valve unit of claim 13, said light valve frame plate comprising a material having a linear expansion coefficient ranging from one-fifth to five times that of a linear expansion coefficient of said fixing frame plate.

15. The light valve unit of claim 14, linear expansion coefficients E1, E2 and E3, of said portion of said prism body, said fixing frame plate and said light valve frame plate, respectively, satisfying the relationship of $E3 \geq E2 \geq E1$.

16. The light valve unit of claim 13, further comprising a medial frame plate between said fixing frame plate and said light valve frame plate, said medial frame plate fixed to said fixing frame plate by said fixing means and bonded to said light valve frame plate.

17. The light valve unit of claim 16, further comprising a temporary fixing member between said medial frame plate and said light valve frame plate, the temporary fixing member temporarily fixing said medial frame plate and said light valve frame plate.

18. The light valve unit of claim 13, said light valve frame plate comprising a first frame plate and a second frame plate holding said light valve between them.

* * * * *